Nov. 20, 1928.  1,692,319
O. ZERK, NOW BY JUDICIAL CHANGE OF NAME O. U. ZERK
GREASE GUN
Filed May 25, 1921
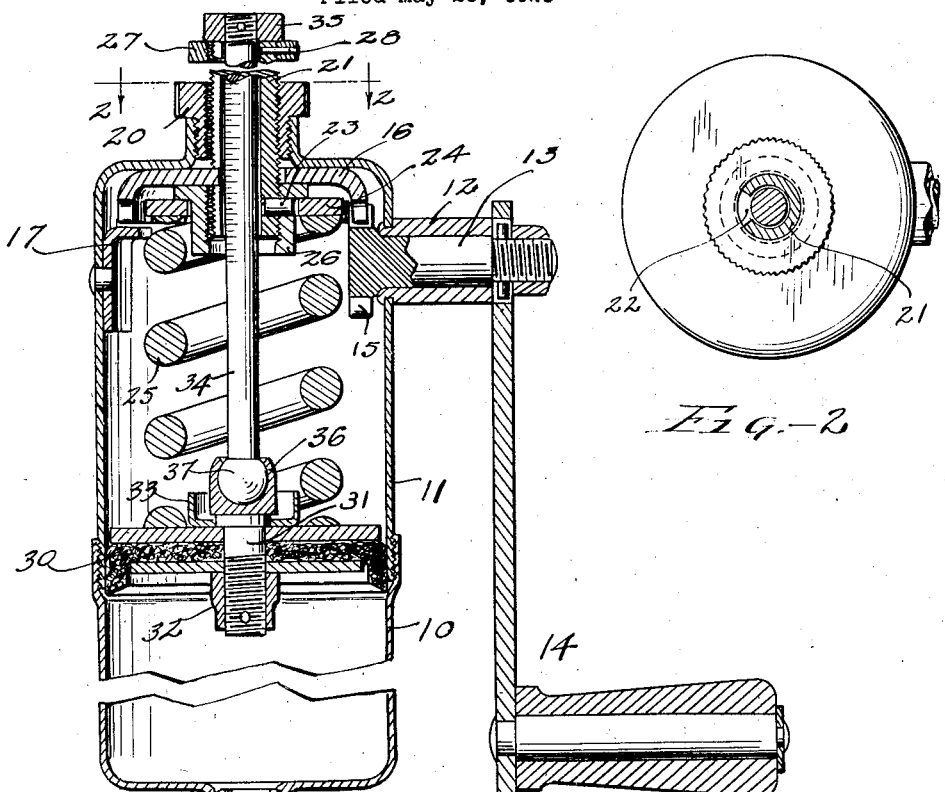
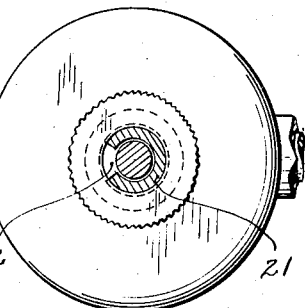
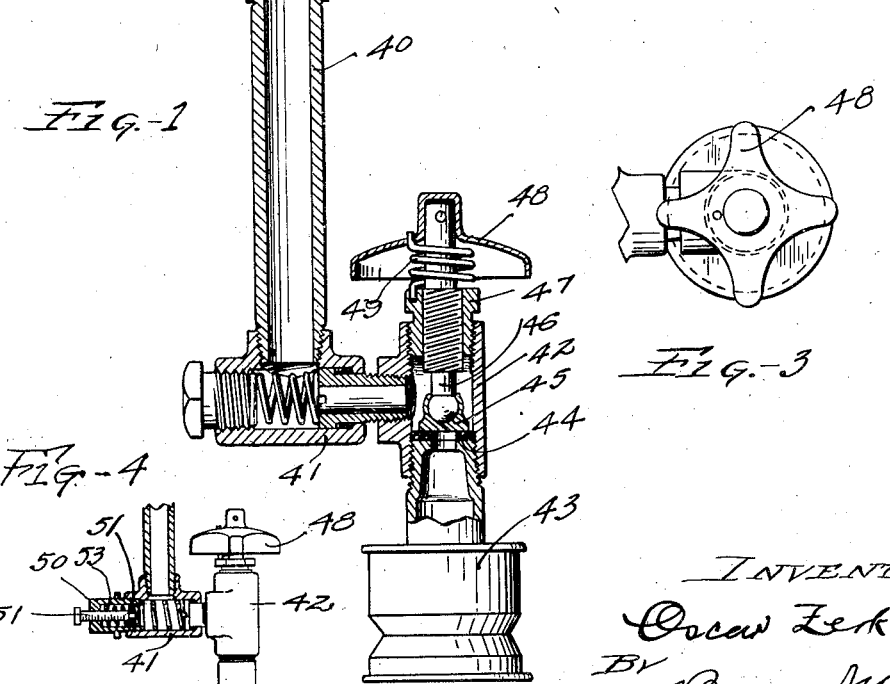
INVENTOR
Oscar Zerk
BY
Baker & Macklin
ATTORNEYS Patented Nov. 20, 1928.

1,692,319

UNITED STATES PATENT OFFICE.

OSCAR ZERK, NOW BY JUDICIAL CHANGE OF NAME OSCAR ULYSSES ZERK, OF CLEVELAND, OHIO, ASSIGNOR, BY MESNE ASSIGNMENTS, TO ALEMITE MANUFACTURING CORPORATION, A CORPORATION OF DELAWARE.

GREASE GUN.

Application filed May 25, 1921. Serial No. 472,432.

My invention relates to a lubricant compressor of the type wherein pressure is created on the grease by means of a piston so as to facilitate the feeding of the grease to grease cups and the like.

One object of my invention is to provide improved means for getting access to nipples in out of the way places with a compressor of the continuous pressure type.

Another feature of the invention is the provision of a compressor of the continuous pressure type with a coupling member having automatic shut off means whereby the loss of grease is prevented when the coupling is disconnected from the nipples.

Further objects of the invention will be apparent in the course of the following description and features of novelty will be pointed out in the claims.

In the drawings which represent a preferred embodiment of my invention, Fig. 1 is a longitudinal section through a compressor and coupling; Fig. 2 is a view of the compressor taken on line 2—2 of Fig. 1; and Fig. 3 is a plan view looking down from the top of the cut-off valve; Fig. 4 is a fragmentary view showing pressure indicating means which may be employed.

The device as illustrated comprises a compressor barrel consisting of the members 10 and 11, the member 10 being the grease retaining member. I prefer to flare the upper end of this member and provide it with interior threads for receiving the threads of the member 11. The object of providing the flare is to enable the ready filling of the compressor according to the method set out in my co-pending application, Serial #452,128, filed March 14th, 1921.

The member 11 may be provided with an opening adapted to receive a sleeve 12 carrying a stud shaft 13 therein, this shaft being shown as connected at its outer end with a suitable handle 14, and having at its inner end a pinion 15 adapted to mesh with the gear 16, also within the member 11. An angle member 17, having an inwardly projecting portion, may be secured to the wall member 11 and serves as a means for preventing displacement of the gear member 16.

The upper end of the member 11 is shown as provided with a threaded boss adapted to receive the tubular nut 20 which has an exterior thread for engagement with the boss, and is interiorly threaded to receive a sleeve or hollow stem 21. I prefer to make this latter member in the form as shown in Fig. 2, that is, it consists of a sleeve member in the form of an imperfectly closed tube, so that it has a longitudinal slot 22 throughout its extent. This makes a cheap construction because in the making of tubular products the metal is often brought to this shape in the course of manufacture.

The gear member 16 surrounds the tubular member 21 and has a projecting portion extending into the slot 22 whereby the gear 16 is feathered upon the sleeve 21.

At its lower end, the sleeve 21 carries a follower comprising an abutment member 26 and a ring 24. These members serve as an abutment for one end of a spring 25. I prefer to provide the upper end of sleeve 21 with a stop member to prevent the moving of this member too far into the compressor. As shown, this stop comprises the nut 27 held in position thereon by a pin 28.

A convenient method of accomplishing the connection between member 26 and the sleeve 21 consists in providing interior threads on the member 26 engaging with the threads on the sleeve 21, and locking the two members together by means of a pin 23 extending into registering openings on the two members. On its upper end, member 26 is provided with an annular flange forming a shoulder adapted to receive the ring 24 which serves as an abutment for one end of the helical spring 25. The spring is preferably flattened at its ends so as to insure engagement around a substantial portion of the ring so as to prevent canting thereof. At its lower end the spring bears in a similar manner on a piston 30.

The piston 30 may be of any approved type. As illustrated it consists of upper and lower metal plates holding a leather washer between them. A central stem or pin 31 passes through these members and has at its upper end a shoulder engaging the upper plate and is threaded on its lower end to receive a nut 32 whereby the members may be clamped together.

Swiveled about the stem above the upper plate is a cup member 33 which serves as a guide means for the spring. Secured to the piston I also provide a graduated stem 34 which extends upwardly through the opening in the sleeve 21 and may have secured on its upper end a nut 35 serving as a stop to limit the inward motion of the stem. I prefer to make the connection between the piston and the stem 34 of a yieldable nature so that a slight canting of the piston or disalignment thereof with the stem will not cause distortion of the stem, and for this purpose I have shown a ball socket 36 formed on the upper portion of the member 31 and receiving the spherical end 37 of the stem 34.

The member 10 is provided with a means for connecting it to a coupling member which is shown as comprising a threaded boss receiving the pipe connection 40, which in turn is connected by means of an elbow and swivel joint 41 to the elbow member 42. This member has a threaded side opening to receive the stem of the swivelled member, and aligned longitudinal openings, one of these being threaded to receive the nipple of a self-sealing coupling or the like 43, adapted to be placed upon a grease cup and to have a quick detachable sealed communication therewith. This quick detachable coupling member may be of any approved form, though I prefer to employ a self-sealing coupling such as is shown, described and claimed in my co-pending application, Serial #452,127, filed March 14th, 1921.

The end of the nipple of member 43 may have a flat face on which a leather washer 44 is seated. This washer after insertion will be retained in position sufficiently by means of the threads on member 42, and the pressure of the grease will also tend to hold this member in place.

The other opening in member 42 carries threaded therein a tubular nut 47, which is interiorly threaded to receive the enlarged threaded portion of a stem 46, which has its inner end spherical and seated in the ball socket of a valve member 45 adapted to fit against the washer 44.

Pinned on the outer end of this stem, I provide an operating handle which is herein shown in the form of a star wheel 48. A spring 49 connected to the star wheel and to nut 47 tends to hold the stem in position to close the valve. When pressure is created within the compressor chamber and the coupling 43 has been placed in position on a grease cup nipple or the like, the operator turns the star wheel a quarter revolution, which serves to raise the valve 45 from its seat and to allow the passage of lubricant from the gun. When the nipple has been filled, the operator releases the star wheel and the spring 49 returns the valve member to seated position. The provision of a ball connection insures complete seating of the valve member 45 because it can rest squarely thereon and there is no strain transmitted to the stem member.

In operation it will be seen that if the compressor has been filled, the operator by turning the handle 14 may cause the follower, together with its sleeve 21, to move downward and compress spring 25. It will be noticed that the motion of the follower and sleeve 21 is the same since these members are pinned together, and therefore this action tending to compress the spring causes a motion between the sleeve 21 and stem 34 so that a portion of this stem will now extend beyond the sleeve and will indicate the amount of pressure being exerted upon the grease. The nut 35, however, has its position determined by the grease in the compressor and therefore the amount by which the stem 34 extends above the nut 20 will indicate the amount of grease remaining in the compressor.

Applicant has therefore provided a very convenient indicating device showing at all times the exact condition existing in the grease chamber. The ball and socket connection shown between the piston and stem prevents any canting of the piston from tending to distort the stem or any disalignment of the stem from canting the piston.

The applicant has furthermore provided by means of his automatic shut-off valve an arrangement which insures against waste of grease.

While I consider the arrangement of the pressure indicator as above described and shown in Fig. 1, as very satisfactory, there are many other arrangements falling within the scope of my invention and I have illustrated in Fig. 4, by way of example one such arrangement. As shown in Fig. 4, a tubular member 50 is inserted in one end of the elbow 41. This member carries a stem 51 having a piston 52 on the end thereof. A spring 53 may be employed to force the piston inwardly, and the stem, if desired, may be graduated. The pressure of the grease acting upon the piston will force the stem outwardly against the action of the spring 53, thereby indicating the pressure. Where this pressure arrangement, herein indicated is employed, it will be unnecessary to provide the pressure indication as shown in Fig. 1, although the two may be used if desired.

While I have described a specific embodiment of my invention, it is apparent that many changes might be made therein, and the description is therefore to be taken as illustrative of a particular embodiment of the invention rather than restrictive of the character and scope of the invention.

Having thus described my invention, I claim:

1. A portable lubricant compressor having means for maintaining pressure on a contained body of lubricant, a rigid discharge tube, swiveled coupling means and a control valve at the outer end of said tube, resilient means normally holding said valve closed, and manual means at the outer end of said tube for opening said valve, said manual means being in alignment with said coupling means.

2. In a grease gun of the character described, the combination of a gun barrel having the discharge end thereof secured to coupling means, a swivel member supporting said coupling means and engaging said end of the gun, said swivel member having a passageway affording communication between the gun barrel and the discharge mouth of the coupling means, and valve means for closing said passageway comprising a valve stem mounted in a threaded aperture formed in the swivel head.

3. A lubricant coupling comprising a valve chamber having a valve seat defining an outlet for said chamber, means for making a quick detachable connection with a lubricant receiving element, said means communicating with said chamber through said outlet, a valve for closing said outlet, a valve stem extending outside said valve chamber and in axial alignment with said connecting means, said valve stem being threaded in the wall of said chamber, and a torsion spring tending to rotate said stem and close said valve.

In testimony whereof, I hereunto affix my signature.

OSCAR ZERK.